(12) United States Patent
Jiao et al.

(10) Patent No.: US 8,202,928 B2
(45) Date of Patent: Jun. 19, 2012

(54) AMINE-CURED SILICONE COMPOSITIONS RESISTANT TO HYDROCARBON FLUID AND USES THEREOF

(75) Inventors: Jinbao Jiao, Buffalo Grove, IL (US); Stanton Rak, Evanston, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 909 days.

(21) Appl. No.: 12/190,834

(22) Filed: Aug. 13, 2008

(65) Prior Publication Data

US 2010/0038856 A1   Feb. 18, 2010

(51) Int. Cl.
*C08K 3/18*   (2006.01)

(52) U.S. Cl. ........ 524/431; 524/433; 524/779; 524/785; 156/329

(58) Field of Classification Search .................. 524/431, 524/433, 779, 785; 156/329
See application file for complete search history.

(56) References Cited

U.S. PATENT DOCUMENTS

| | | | | |
|---|---|---|---|---|
| 3,541,044 A | * | 11/1970 | Beers et al. | 524/847 |
| 4,356,116 A | * | 10/1982 | Beers | 524/837 |
| 4,735,979 A | | 4/1988 | Beers et al. | |
| 6,103,804 A | * | 8/2000 | Davis | 524/431 |
| 6,413,354 B1 | | 7/2002 | Haas et al. | |
| 6,503,980 B2 | | 1/2003 | Pantone et al. | |
| 2004/0127669 A1 | | 7/2004 | Ueno et al. | |

* cited by examiner

*Primary Examiner* — Bernard Lipman

(57) ABSTRACT

A silicone composition is provided that is resistant to a hydrocarbon fluid, such as a transmission fluid, and other harsh environments when cured. The silicone composition includes a dihydroxy-terminated silicone fluid, a filler material and amine-cured cross-linking agent, the composition containing substantially no plasticizer, and wherein the cured composition can be utilized as a sealant that is resistant to exposure to transmission fluid and high temperatures for extended periods of time. The silicone composition provides effective sealant properties that withstand the foregoing conditions present in the transmission fluids. Methods of making and using the cured silicone sealants made from the present compositions are also provided.

19 Claims, No Drawings

AMINE-CURED SILICONE COMPOSITIONS RESISTANT TO HYDROCARBON FLUID AND USES THEREOF

CROSS-REFERENCE TO RELATED APPLICATIONS

U.S. application Ser. No. 12/190,813, entitled "A Seal Apparatus and Method of Manufacturing the Same," and U.S. application Ser. No. 12/190,876, entitled "A Method of Preparing Amine-Cured Silicone Compositions Resistant to Hydrocarbon Fluid and Uses Thereof," both of which were filed on the same date with the present application, and both of which applications are hereby incorporated by reference in their entireties.

BACKGROUND OF THE INVENTION

1. Field of the Invention

An amine-cured silicone composition resistant to exposure to hydrocarbon fluids and other harsh environments is provided herein and, in particular, an amine-cured silicone composition containing substantially no plasticizer and which is resistant to a transmission fluid at high temperatures.

2. Description of the Prior Art

Room-temperature vulcanization ("RTV") silicone compositions can be used as sealants and adhesives in the automotive industry. A common use of RTV silicone sealants is with electronic devices that are submerged in a synthetic hydrocarbon fluid, such as a transmission fluid, where these devices may require some type of seal about their housing in order to prevent the transmission fluid from ingressing into the electronic cavity. The sealing area can include the housing, connector, metal leads, and the like.

The electronic devices may be used in automotive transmission assemblies to control the operation of the transmission system. The electronic devices can be placed in housings that are typically partially or completely submerged in the transmission fluid within the assembly. One or more electric leads typically enter and exit the housing to supply power or carry control signals to or from the electronic devices within the housing or to and from other components outside the housing. If the electronic device housings are not properly sealed, the transmission fluid can leak into the housing. If the transmission fluid reaches the electronic devices, the devices may become disabled or may malfunction and thereby disable the system, which can alter the performance of the vehicle.

One method of preventing the transmission fluid from leaking into the electronic device at around the entry points of the electric leads is to utilize a silicone sealant associated with the leads. Typically, a sealing cell or cavity can be formed about the leads where the leads enter the housing. After the sealing cell or cavity is formed, an adhesive or sealant can be applied into the cell or cavity in an attempt to prevent fluid entry into the electronic device. However, the sealants commonly used can debond from the sealing cell and/or become degraded.

Commonly used sealing materials in transmission systems can include Platinum ("Pt")-cured silicones, conventional amine-cured RTV silicones, acrylics, urethanes, and fluorosilicones; unfortunately, these sealing materials are not effective in most commonly used transmission fluids, such as Dexron® VI (used by General Motors), due to degradation and/or high-temperature instability. When typical RTV sealant compositions are exposed to hot transmission fluid, including, for example, the synthetic transmission fluid Dexron® VI, the composition itself often becomes degraded and its bonding strength to the surface decreases. Additionally, epoxy-based sealants can have improved stability in certain transmission fluids, however, they frequently become brittle with prolonged exposure and have a lower ionic purity that can lead to resistance drops at elevated temperatures. Perfluoropolyether based adhesives, such as Sifel®, manufactured by Shin-Etsu Chemical Co., Ltd., may have sufficient stability when immersed in certain transmission fluids, but do not provide the necessary initial adhesion to plastics or aluminum used to house the electronic devices. Furthermore, the cost of perfluoropolyethers is approximately tenfold as expensive compared to common silicone sealants not to mention its limited world supply.

Moreover, platinum-cured silicones are found to be relatively unstable upon exposure to transmission fluid while a conventional amine-cured silicone can have greater stability in comparison. It is believed that the reason for this instability of Pt-cured silicones is due to the carbon-carbon segment in the backbone structure; whereas the RTV silicone backbone structure comprises silicon-oxygen (Si—O) bonds. The structural similarity of the carbon-carbon bond to hydrocarbon-based transmission fluid makes Pt-cured silicone easier to dissolve and swell in the synthetic transmission fluid and makes it more prone to the attack of either base, acid, or free radical species.

Commercially available RTV silicone sealants do not currently exhibit desirable results in all areas of adhesion and resistance to various surfaces when exposed to transmission fluid. In general, oxime-cured and alkoxy-cured sealants debond from the substrate, whether aluminum or plastic. The conventional amine-cured sealants can exhibit bonding to either substrate, yet exhibit cohesive failure with peeling. Additionally, the conventional amine-cured sealants exhibit the greatest weight loss when compared to the other sealants.

Automatic transmission fluid (ATF) is considered the lifeblood of the automatic transmission, therefore replacing the transmission fluid with something less harsh on the sealant material is not feasible. ATF is used to transfer power in the torque converter and provide the pressure to apply the transmission's various clutches and bands. It also is used to clean, lubricate and cool the components of the transmission. Another use of the RTV silicone sealants can be as gasket sealants and/or as formed-in-place gaskets for use in internal combustion engines.

Although conventional amine-cured RTV silicone sealants exhibit some amount of stability after exposure to transmission fluid, the conventional amine-cured RTV has a significant amount of weight loss upon prolonged exposure to the transmission fluid, as well as contributing to foaming within the transmission assembly. Most transmission fluids already contain an anti-foaming agent therein, however, when the conventional amine-cured silicone sealant is introduced, the anti-foaming agent becomes ineffective and foaming results. Typically, foam is harder to cool down than a liquid and therefore the transmission fluid cannot be cooled properly and a thermal runaway condition in the transmission is possible, e.g., the transmission assembly can overheat. As a result, automotive manufacturers have recommended against using silicone sealants in these environments with the belief that these silicone compounds are responsible for these conditions and hence are ineffective and can be "attacked" in these environments. However, the true cause for the foaming issue is not thoroughly understood in the art. Furthermore, the conventional amine-cured RTV silicone sealants contain a substantial amount of a plasticizer.

DETAILED DESCRIPTION

An amine-cured silicone containing substantially no plasticizer and having improved sealant properties when exposed to harsh environmental conditions and to hydrocarbon fluids, including, for example, the environmental conditions inside the transmission housing of a vehicle where transmission fluid is present, is provided herein. More specifically, a dihydroxy-terminated silicone polymer and an amine-cured cross-linking agent can provide an RTV silicone composition with improved sealing properties in hydrocarbon fluids and other harsh environments. For example, the synthetic hydrocarbon fluid can include engine oil, cooling fluid, transmission fluid, petroleum-based fluid, and the like. The composition provides a seal on surfaces of a housing for an electronic device immersed in the presence of a transmission fluid. In one aspect, the silicone composition can include a dihydroxy-terminated silicone polymer, an amine-cured cross-linking agent, and a filler material for maintaining adhesion or sealing of the composition after exposure and immersion in a transmission fluid or other harsh environments. Relatively no plasticizers nor catalysts are used in the composition. The composition is subsequently formed into an appropriate sealant configuration and then allowed to cure at room temperature to form a transmission fluid-resistant silicone sealant. The reaction product of this silicone composition is a sealant that is resistant to the transmission fluid and other corrosive liquids and harsh environments.

Furthermore, the sealant with substantially no plasticizer provides a silicone sealant that is compatible with transmission fluid. Additionally, no use of a catalyst can further provide for resistance of the sealant within the transmission fluid by potentially inhibiting reversion of the polymer backbone at high temperatures within the transmission fluid.

The amounts of the dihydroxy-terminated silicone polymer in the composition may range from about 25% to about 35% by weight. The amine-cured cross-linking agent may be present in the composition in an amount less than 10% and preferably ranging from about 1% to about 10% by weight, and in particular from about 2% to about 7% by weight. The filler material in the composition may range from about 30% to about 70% by weight, depending upon the desired viscosity of the final product. Preferably, the filler is in an amount that is about 40% by weight. The amount of plasticizer, if any, is in an amount not greater than about 50 ppm.

Generally, a method of preparing the amine-cured silicone composition can comprise mixing together the dihydroxy-terminated silicone polymer, such as polydimethylsiloxane, with the amine-cured cross-linking agent in a mixer to form a mixture, while mixing in an inert atmosphere. In one aspect, while stirring the two together, the temperature can be between about 22° C. and about 50° C. with nitrogen gas added at about 1 atmosphere. After the mixture has been thoroughly mixed (e.g., about 2 hours in one example), the filler material can be added to the mixture. The temperature and pressure can be maintained at similar levels as the initial mixture makeup. After the filler has been added and thoroughly mixed, the mixture forms a relatively uniform paste which contains substantially no plasticizer. The paste can then be cooled to approximately room temperature to result in the silicone composition in a paste form, prior to being applied as a sealant.

When the silicone composition paste is exposed to moisture, such as in ambient conditions, the paste undergoes a condensation reaction that cross-links the dihydroxy-terminated silicone polymer with the amine-cured cross-linking agent, thus curing the paste and forming a sealant. In one aspect, the conditions needed to apply the silicone composition and have it cure to provide a sealant, can be from about 15° C. to about 45° C. with a relative humidity (RH) greater than 15%. In another aspect, preferred conditions can be about 25° C. and 50% RH, although the temperature may also be increased above the ranges given herein in order to accelerate the curing. Upon curing, the sealant can form a silicone rubber with certain elastic properties having greater than about 100% elongation.

The cured RTV sealant can form a strong bond or adhesion to different substances, such as surfaces including plastic, metal, glass and ceramic material. In one aspect, the cured silicone sealant can readily bond to aluminum, glass, and ceramic surfaces and adequately bonds to certain plastics such as polyphenylsulfide. Other plastic surfaces that can bond with the sealant can include poly(acrylonitrile butadiene styrene), polyamide, poly(butylene terephthalate), poly(ethylene terephthalate), polyetherketone, poly(etheretherketone), poly(phenylene oxide), and polyimides. In another aspect, a 35% glass reinforced block polyamide resin called ZYTEL™, manufactured by DuPont, can be used as the surface.

A method of protecting the electrical device placed in the transmission assembly and subsequently immersed in the synthetic hydrocarbon fluid, such as a transmission fluid, can comprise forming a seal between the silicone composition and at least two surfaces of a housing for the electrical device by applying therebetween the sealant paste formed according to the method above. The at least two surfaces may be two different surface types or can be the same. After the silicone sealant cures to the surfaces applied thereto, it remains resistant to immersion in the synthetic hydrocarbon fluid, thus keeping the sealant intact and without degrading. Immersion of the sealant is typically carried out in transmission fluids, however, other synthetic hydrocarbon fluids may be used. Upon immersion in transmission fluid, the sealant can be exposed to harsh environmental conditions, such as temperatures from about 125° C. to about 155° C. for at least about 1000 hours. In another aspect, the conditions can be about 140° C. for at least 1300 hours.

It is believed that the use of a plasticizer in conventional amine-cured silicone compounds contributes to the weight loss and the foaming observed in the transmission assemblies upon exposure of the sealant to the transmission fluid. The use of a plasticizer in the conventional amine-cured silicone compound results in free silicones or non cross-linked molecules. In one aspect, conventional amine-cured silicones can comprise about 25% free silicones. Without being limited to theory, it is believed that the free silicones inhibit the anti-foaming agent found in the transmission fluid, and that it is not necessarily the silicone backbone itself that inhibits the anti-foaming qualities of the fluid, as is widely believed in the industry. Therefore, the presence of plasticizers in the conventional amine-cured silicone sealants and not the silicone compound itself is responsible for interfering with the performance of the anti-foaming agents, thus allowing foaming conditions to form in the transmission fluid, which can subsequently lead to overheating of the transmission assembly due to the difficulties associated with cooling foams. As a result, it is the use of the silicone compounds disclosed herein as sealants for electronic housings immersed in transmission fluids that helps prevent foaming conditions because the sealant does not interfere with the anti-foaming agents in the transmission fluids, thus, allowing the anti-foaming agents to function properly.

The dihydroxy-terminated silicone polymer or RTV silicone component can be a polysiloxane component, such as a polyorganosiloxane, or preferably a polydimethylsiloxane, which includes room-temperature condensation curing silicone polymers. Polysiloxanes are polymers whose backbones consist of alternating atoms of silicon and oxygen. The lack of carbon in the backbone of the chains transforms polysiloxanes into inorganic polymers, having inert properties and resistance to various aqueous solvents.

Such polymers are conventional silicone polymers that are able to cure or vulcanize using moisture from the air at ambient temperature, or at approximately 20° C. to about 25° C. Higher temperatures can be also utilized. The silicone polymers used herein can typically contain functional groups capable of reacting with moisture to substantially cure the composition. For example, such condensation-curing silicone polymers include polydiorganosiloxanes having terminal hydroxy groups that are curable to an elastomer upon cross-linking. In one aspect, polydimethylsiloxane ("PDMS") can be used, which is a polymer composed of alternating silicon and oxygen atoms with two methyl groups attached, thus making it an organic polymer with inert properties having resistance to various aqueous solvents. In another aspect, about 25% to about 35% polydimethylsiloxane can be used for the sealant composition.

The silicone polymers can have viscosities in the range of about 1,000 centipoise (cPs) to about 400,000 cPs. The viscosity may vary depending on the substrate to be sealed onto the metal, plastic, or other surface. Desirably, these polymers have viscosities ranging from about 5,000 cPs to about 40,000 cPs. Additionally, the molecular weight of the silicone polymers can be critical to determining the rheology of the polymer. In one aspect, the molecular weight can be about 100,000 to about 200,000 g/mol. Preferably, the molecular weight can range from about 110,000 to about 140,000 g/mol. Furthermore, the silicone sealant compositions do not include substantial amounts of plasticizers or catalysts. For example, the plasticizer, if present, is in an amount not greater than about 50 ppm.

The silicone composition also can include a cross-linking agent, preferably an amine-cured cross-linking agent. The amine-curing agents may be aliphatic or aromatic and can be present in amounts from about 1% to about 10% by weight. Typical aminosilane cross-linking agents can include, for example, trimethylaminosilane, dibutylaminosilane, tributylaminosilane, methyl tris(cyclohexylamino) silane, dimethylaminosilane, aminopropyltrimethoxysilane, aminopropyltriethoxysilane, cyclohexyl-3-aminopropylmethyldimethoxysilane, aminoethylaminopropyltrimethoxysilane, aminoethyl-aminopropylmethyldimethoxysilane, aminopropylmethyidimethoxysilane, aminopropylmethyl-diethoxysilane, and the like. In one aspect, amine-cured cross-linking agents can include alkylaminosilane, alkyl oximesilane, or alkyl acyloxysilane. The following schematic presents amine-curing agents utilized with the silicone RTV sealant.

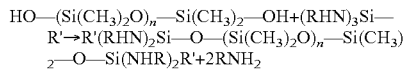

Then,

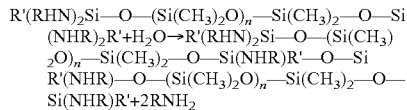

where R represents an alkyl group and R' represents the same or a different type of alkyl group. For example, R may be propyl and R' may be methyl, but other variations of alkyl groups may be used.

The silicone compositions may also contain a filler material that depends upon the desired properties and functions of the final cured product. The filler can provide mechanical properties and stability in the transmission fluid. The filler material, in one aspect, can be present in an amount from about 30% to about 70% by weight. The fillers can include, for example, titanium dioxide, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed cores, calcium clay, carbon, graphite, synthetic fibers, and mixtures thereof. Other conventional fillers can also be incorporated into the present compositions provided they do not adversely affect the fluid and adhesion or sealant properties of the final end product produced therefrom.

The silicone composition may contain optional additional ingredients, such as adhesion promoters and stabilizers, which may be present in amounts ranging from about 1% to about 2% by weight. In one aspect, an adhesion promoter can include gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyidiethylene triamine, 3-glycidoxypropyltrimethoxy silane, gamma-mercaptopropyltrimethoxysilane, and gamma-methacryloxypropyltrimethoxysilane. The adhesion promoter, if used, can be added to the mixture before or after the addition of the filler material.

While the use of the silicone composition is typically with transmission fluids, particularly synthetic transmission fluids such as Dexron® VI transmission fluid, the range of products that can be used with the sealant disclosed herein can include surfaces that are exposed to oil and other synthetic hydrocarbon fluids. Furthermore, the silicone compositions disclosed herein may also be formed in many different configurations and condensation cured over time under ambient or elevated temperature conditions for use in various industries where there is a need for oil and/or fuel-resistant based elastomeric articles.

A method of protecting electrical devices in a transmission assembly can be provided by sealing a housing containing the electrical devices with the silicone sealant disclosed herein. In a preferred aspect, the housing can be plastic. The sealant can be placed where the surface of the housing meets the assembly, or at the cavities of the housing where electrical leads enter and exit therefrom. A seal is then formed when the sealant cures at room temperature. The cured sealant is resistant to high temperatures and prolonged exposure to the transmission fluid.

It will be understood that the composition of the amine-cured silicone sealant with substantially no plasticizer may be varied in many ways, and such variations are not to be regarded as a departure from the spirit and scope of the composition disclosed herein. All such modifications are intended to be included within the scope of the following claims.

What is claimed is:
1. A silicone composition comprising:
   a dihydroxy-terminated silicone polymer;
   a filler; and
   an amine-cured cross-linking agent all in amounts effective to result in the composition, the composition containing substantially no plasticizer such that the plasticizer is in an amount not greater than about 50 ppm and providing a seal between two or more surfaces, the seal being maintained in the presence of a synthetic hydrocarbon fluid.

2. The silicone composition according to claim 1, wherein the synthetic hydrocarbon fluid is selected from the group consisting of engine oil, cooling fluid, transmission fluid, and petroleum-based fluid.

3. The silicone composition according to claim 2, wherein the synthetic hydrocarbon fluid is transmission fluid.

4. The silicone composition according to claim 1, wherein the composition is exposed to conditions of about 125° C. to about 155° C. for at least about 1000 hours.

5. The silicone composition according to claim 1, wherein the amine-cured cross-linking agent is present in amounts between about 1% and about 10% by weight and is selected from the group consisting of trimethylaminosilane, dibutylaminosilane, tributylaminosilane, methyl tris (cyclohexylamino) silane, dimethylaminosilane, aminopropyltrimethoxysilane, aminopropyltriethoxysilane, cyclohexyl-3-aminopropylmethyl-dimethoxysilane, aminoethylaminopropyltrimethoxysilane, aminoethylaminopropylmethyl-dimethoxysilane, aminopropylmethyldimethoxysilane, and aminopropylmethyldiethoxysilane.

6. The silicone composition according to claim 1, wherein the dihydroxy-terminated silicone polymer is present in amounts between about 25% and about 35% by weight.

7. The silicone composition according to claim 6, wherein the dihydroxy-terminated silicone polymer is a polyorganosiloxane having terminal hydroxy groups.

8. The silicone composition according to claim 1, wherein the silicone polymer has a viscosity between about 1,000 cPs and about 400,000 cPs.

9. The silicone composition according to claim 1, wherein the filler is present in an amount between about 30% and about 70% by weight and is selected from the group consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed cores, calcium clay, carbon, graphite, cork, cotton, synthetic fibers, and mixtures thereof.

10. The silicone composition according to claim 1, further comprising an adhesion promoter added to the composition in amounts between about 1% and about 2% by weight and selected from the group consisting of gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, 3-glycidoxypropyltrimethoxy silane, gamma-mercaptopropyltrimethoxysilane, and gamma-methacryloxypropyltrimethoxysilane.

11. The silicone composition according to claim 1, wherein the surfaces are selected from the group consisting of metal, plastic, glass, and ceramic material.

12. The silicone composition according to claim 11, wherein at least one of the surfaces is aluminum.

13. The silicone composition according to claim 11, wherein at least one of the surfaces is a plastic selected from the group consisting of poly(acrylonitrile butadiene styrene), polyamide, poly(butylene terephthalate), poly(ethylene terephthalate), polyetherketone, poly(etheretherketone), poly (phenylene oxide), polyimides, and poly(phenyl sulfide).

14. A method of providing a seal between two or more surfaces using a sealant, the sealant resistant to immersion in a synthetic hydrocarbon fluid, comprising:
    forming the sealant from a silicone composition comprising a dihydroxy-terminated silicone polymer, a filler, and an amine-cured cross-linking agent, the composition containing substantially no plasticizer such that the plasticizer is in an amount not greater than about 50 ppm; and
    applying the sealant to the surfaces at a temperature between about 15° C. and about 45° C. and a relative humidity greater than about 15% to result in the seal.

15. The method according to claim 14, wherein the amine-cured cross-linking agent is present in amounts between about 1% and about 10% by weight and is selected from the group consisting of trimethylaminosilane, dibutylaminosilane, tributylaminosilane, methyl tris (cyclohexylamino) silane, dimethylaminosilane, aminopropyltrimethoxysilane, aminopropyltriethoxysilane, cyclohexyl-3-aminopropylmethyl-dimethoxysilane, aminoethylaminopropyltrimethoxysilane, aminoethylaminopropylmethyl-dimethoxysilane, aminopropylmethyldimethoxysilane, and aminopropylmethyldiethoxysilane.

16. The method according to claim 14, wherein the dihydroxy-terminated silicone polymer is present in amounts between about 25% and about 35% by weight and is a polyorganosiloxane polymer.

17. The method according to claim 14, wherein the surfaces are selected from the group consisting of metal, plastic, glass, and ceramic material.

18. The method according to claim 14, wherein the synthetic hydrocarbon fluid is a transmission fluid and the sealant is immersed in the transmission fluid at a temperature of about 125° C. to about 155° C. for at least about 1000 hours.

19. A silicone composition comprising:
    a polydimethylsiloxane;
    a filler; and
    an amine-cured cross-linking agent, the composition containing substantially no plasticizer such that the plasticizer is in an amount not greater than about 50 ppm and providing a seal between two or more surfaces of a housing for an electronic device immersed in the presence of a transmission fluid.

* * * * *